(12) United States Patent
Suhre et al.

(10) Patent No.: US 7,591,337 B2
(45) Date of Patent: Sep. 22, 2009

(54) LEANING SUSPENSION MECHANICS

(75) Inventors: Ryan J. Suhre, Linden, MI (US); Andrew D. Massignan, Waukesha, WI (US); Andrew H. Roth, West Bend, WI (US); Mark Hutchison, New Berlin, WI (US); Scott J. Saiki, Dousman, WI (US)

(73) Assignees: Harley-Davidson Motor Company Group, LLC, Milwaukee, WI (US); Delphi Technologies, Inc., Troy, MI (US)

( * ) Notice: Subject to any disclaimer, the term of this patent is extended or adjusted under 35 U.S.C. 154(b) by 398 days.

(21) Appl. No.: 11/535,545

(22) Filed: Sep. 27, 2006

(65) Prior Publication Data

US 2007/0075517 A1     Apr. 5, 2007

Related U.S. Application Data

(60) Provisional application No. 60/722,114, filed on Sep. 30, 2005.

(51) Int. Cl.
   *B62D 61/06*     (2006.01)
   *B60G 21/00*    (2006.01)
(52) U.S. Cl. .................. 180/210; 180/41; 280/5.509; 280/6.155; 280/6.15; 280/124.103; 280/124.135
(58) Field of Classification Search .......... 280/124.103, 280/124.134, 124.135, 124.136, 124.138, 280/124.141, 124.157, 5.501, 5.502, 5.507, 280/5.508, 5.509, 5.51; 180/210, 41
   See application file for complete search history.

(56) References Cited

U.S. PATENT DOCUMENTS

| | | | |
|---|---|---|---|
| 1,975,117 A | 10/1934 | Millington | |
| 2,279,120 A | 4/1942 | Hurley | |
| 2,641,480 A | 6/1953 | Bancroft | |
| 2,689,747 A | 9/1954 | Kolbe | |
| 2,788,986 A | 4/1957 | Kolbe | |
| 2,961,254 A | 11/1960 | Muller | |
| 3,008,729 A | 11/1961 | Muller et al. | |
| 3,497,233 A * | 2/1970 | Bolaski, Jr. | ............ 280/86.757 |
| 3,572,456 A | 3/1971 | Healy | |
| 3,610,358 A | 10/1971 | Korff | |
| 3,776,353 A | 12/1973 | Roth | |

(Continued)

FOREIGN PATENT DOCUMENTS

WO     2005002957 A1     1/2005

*Primary Examiner*—Ruth Ilan
(74) *Attorney, Agent, or Firm*—Michael Best & Friedrich LLP

(57) ABSTRACT

A vehicle including a frame, left and right wheels, and a leaning suspension system. The frame defines a longitudinal vehicle axis. The leaning suspension system includes a transverse beam, left and right damping members, left and right control arms, and at least one lean actuator. The transverse beam is coupled to the frame and pivotable about the vehicle axis. The left and right damping members are pivotally coupled to the left and right sides of the transverse beam. The left control arm is pivotally coupled to the left wheel and to the frame, and the right control arm is pivotally coupled to the right wheel and to the frame. The lean actuator is pivotally connected between the frame and the transverse beam. The lean actuator is configured to extend and retract to tilt the left and right wheels and to lean the vehicle while cornering.

21 Claims, 6 Drawing Sheets

U.S. PATENT DOCUMENTS

| | | | |
|---|---|---|---|
| 3,826,326 A | 7/1974 | Blair | |
| 3,938,609 A | 2/1976 | Kensaku et al. | |
| 3,966,006 A | 6/1976 | Cullinan | |
| 3,977,694 A | 8/1976 | Nordstrom | |
| D242,849 S | 12/1976 | Gilbert | |
| 4,020,914 A | 5/1977 | Trautwein | |
| 4,045,048 A | 8/1977 | Irwin | |
| 4,047,732 A | 9/1977 | Williams et al. | |
| 4,049,287 A | 9/1977 | Dudouyt | |
| 4,050,711 A | 9/1977 | Denzer | |
| 4,050,712 A | 9/1977 | Denzer et al. | |
| 4,050,713 A | 9/1977 | Williams | |
| 4,054,300 A | 10/1977 | Winchell | |
| 4,064,957 A | 12/1977 | Parham | |
| 4,065,144 A | 12/1977 | Winchell | |
| 4,065,146 A | 12/1977 | Denzer | |
| 4,071,261 A | 1/1978 | Winchell | |
| 4,072,325 A * | 2/1978 | Bright et al. | 280/5.521 |
| 4,076,270 A | 2/1978 | Winchell | |
| 4,087,104 A | 5/1978 | Winchell et al. | |
| 4,087,106 A | 5/1978 | Winchell | |
| 4,087,107 A | 5/1978 | Winchell | |
| 4,087,108 A | 5/1978 | Winchell | |
| 4,088,199 A | 5/1978 | Trautwein | |
| 4,088,338 A | 5/1978 | Winchell et al. | |
| 4,114,713 A | 9/1978 | Mery | |
| 4,119,170 A | 10/1978 | Hutcherson | |
| 4,123,079 A | 10/1978 | Biskup | |
| 4,133,551 A | 1/1979 | Biskup | |
| 4,159,128 A * | 6/1979 | Blaine | 280/5.521 |
| 4,162,605 A | 7/1979 | Olin et al. | |
| 4,165,093 A | 8/1979 | Biskup | |
| 4,237,995 A | 12/1980 | Pivar | |
| 4,277,076 A | 7/1981 | Hanna | |
| 4,287,960 A | 9/1981 | McConnell | |
| 4,313,517 A | 2/1982 | Pivar | |
| D263,693 S | 4/1982 | Kaiser et al. | |
| 4,325,448 A | 4/1982 | Pivar | |
| 4,325,565 A | 4/1982 | Winchell | |
| 4,351,410 A | 9/1982 | Townsend | |
| 4,360,224 A | 11/1982 | Sato et al. | |
| 4,373,600 A | 2/1983 | Buschbom et al. | |
| 4,412,595 A | 11/1983 | Kinzel | |
| 4,423,795 A | 1/1984 | Winchell et al. | |
| 4,431,204 A | 2/1984 | Miyakoshi et al. | |
| 4,431,205 A | 2/1984 | Speicher et al. | |
| 4,433,851 A | 2/1984 | Miyakoshi et al. | |
| 4,437,535 A | 3/1984 | Winchell et al. | |
| 4,451,065 A | 5/1984 | Williams, Jr. | |
| 4,453,616 A | 6/1984 | Porter | |
| 4,453,763 A | 6/1984 | Richards | |
| 4,463,824 A | 8/1984 | Boyesen | |
| 4,465,156 A | 8/1984 | Richardson et al. | |
| 4,478,305 A | 10/1984 | Martin, II | |
| 4,484,648 A | 11/1984 | Jephcott | |
| 4,497,503 A | 2/1985 | Irwin | |
| D278,044 S | 3/1985 | Ohba | |
| 4,526,390 A | 7/1985 | Skolnik | |
| 4,531,606 A | 7/1985 | Watanabe | |
| 4,540,061 A | 9/1985 | Watanabe | |
| 4,546,997 A | 10/1985 | Smyers | |
| RE32,031 E | 11/1985 | Winchell | |
| 4,573,702 A | 3/1986 | Klem | |
| 4,582,157 A | 4/1986 | Watanabe | |
| 4,583,613 A | 4/1986 | Nakayama | |
| 4,588,196 A | 5/1986 | Williams, Jr. | |
| 4,592,441 A | 6/1986 | Marier et al. | |
| 4,600,216 A | 7/1986 | Burkholder | |
| 4,624,469 A | 11/1986 | Bourne, Jr. | |
| 4,632,210 A | 12/1986 | Yamamoto et al. | |
| 4,639,008 A | 1/1987 | Krettenauer et al. | |
| 4,660,853 A | 4/1987 | Jephcott | |
| 4,678,053 A | 7/1987 | Watanabe et al. | |
| 4,690,235 A | 9/1987 | Miyakoshi | |
| 4,691,799 A | 9/1987 | Watanabe | |
| 4,697,663 A | 10/1987 | Trautwein | |
| D292,565 S | 11/1987 | Badsey | |
| D294,686 S | 3/1988 | Ableidinger et al. | |
| D295,395 S | 4/1988 | Saito et al. | |
| 4,744,434 A | 5/1988 | Miyakoshi et al. | |
| 4,787,470 A | 11/1988 | Badsey | |
| 4,796,720 A | 1/1989 | Bauer | |
| 4,811,810 A | 3/1989 | Watanabe | |
| 4,886,149 A | 12/1989 | Uehara et al. | |
| 4,887,829 A | 12/1989 | Prince | |
| D305,745 S | 1/1990 | Hayata | |
| 4,903,857 A | 2/1990 | Klopfenstein | |
| 4,913,255 A | 4/1990 | Takayanagi et al. | |
| 4,921,263 A | 5/1990 | Patin | |
| 4,974,863 A | 12/1990 | Patin | |
| 4,998,596 A | 3/1991 | Miksitz | |
| 5,005,859 A | 4/1991 | Satoh et al. | |
| 5,039,121 A | 8/1991 | Holter | |
| 5,040,812 A | 8/1991 | Patin | |
| 5,116,069 A * | 5/1992 | Miller | 280/5.509 |
| 5,169,166 A | 12/1992 | Brooks | |
| 5,209,506 A | 5/1993 | Klopfenstein | |
| 5,238,261 A | 8/1993 | Ogiso | |
| 5,240,267 A | 8/1993 | Owsen | |
| 5,244,190 A | 9/1993 | Bianchi | |
| 5,257,671 A | 11/1993 | Watkins | |
| D344,914 S | 3/1994 | McNutt | |
| 5,343,974 A | 9/1994 | Rabek | |
| 5,360,078 A | 11/1994 | Rifenburg et al. | |
| 5,383,683 A | 1/1995 | Hufgard | |
| 5,487,443 A | 1/1996 | Thurm | |
| 5,499,689 A | 3/1996 | Johnson | |
| 5,529,141 A | 6/1996 | Lehman et al. | |
| 5,580,089 A | 12/1996 | Kolka | |
| 5,591,282 A | 1/1997 | Weber et al. | |
| 5,611,555 A | 3/1997 | Vidal | |
| D384,626 S | 10/1997 | Lehman et al. | |
| D386,469 S | 11/1997 | Lehman et al. | |
| 5,692,577 A | 12/1997 | Dornbusch et al. | |
| 5,727,864 A | 3/1998 | Stelling et al. | |
| 5,762,351 A | 6/1998 | SooHoo | |
| 5,765,846 A | 6/1998 | Braun | |
| 5,785,141 A | 7/1998 | Breitkreutz et al. | |
| 5,806,622 A | 9/1998 | Murphy | |
| 5,810,383 A | 9/1998 | Anderson | |
| D404,688 S | 1/1999 | Hanagan et al. | |
| 5,884,717 A | 3/1999 | Lehman et al. | |
| 5,899,291 A | 5/1999 | Dumais | |
| 5,927,424 A | 7/1999 | Van Den Brink et al. | |
| 5,941,548 A | 8/1999 | Owsen | |
| 5,960,901 A | 10/1999 | Hanagan | |
| 5,975,225 A | 11/1999 | Kamen et al. | |
| 6,003,880 A | 12/1999 | Kokotovic | |
| D424,979 S | 5/2000 | Hanagan et al. | |
| 6,062,581 A | 5/2000 | Stites | |
| D427,943 S | 7/2000 | Lehman et al. | |
| D433,656 S | 11/2000 | Hanagan et al. | |
| 6,158,279 A | 12/2000 | Saiki | |
| 6,164,675 A | 12/2000 | Pickering | |
| 6,169,939 B1 | 1/2001 | Raad et al. | |
| 6,170,838 B1 | 1/2001 | Laurent et al. | |
| 6,206,124 B1 | 3/2001 | Mallette et al. | |
| 6,250,649 B1 | 6/2001 | Braun | |
| 6,257,362 B1 | 7/2001 | Scherbarth | |
| D446,760 S | 8/2001 | Turgeon et al. | |
| 6,273,003 B1 | 8/2001 | Benker et al. | |
| 6,276,480 B1 | 8/2001 | Aregger | |
| 6,328,125 B1 | 12/2001 | Van Den Brink et al. | |
| 6,390,219 B1 | 5/2002 | Vaisanen | |

| | | | | | | |
|---|---|---|---|---|---|---|
| 6,406,036 | B1 | 6/2002 | Laurent et al. | 6,874,793 B2 | 4/2005 | Choudhery |
| D461,438 | S | 8/2002 | Turgeon | 6,880,840 B2 | 4/2005 | Chuang |
| 6,435,522 | B1 | 8/2002 | Van Den Brink et al. | 6,883,814 B2 | 4/2005 | Chuang |
| 6,464,030 | B1 | 10/2002 | Hanagan et al. | 6,886,842 B2 | 5/2005 | Vey et al. |
| 6,467,561 | B1 | 10/2002 | Boiyin et al. | 6,908,090 B2 | 6/2005 | Chuang |
| 6,478,098 | B2 | 11/2002 | Boiyin et al. | 6,908,091 B2 | 6/2005 | Chuang |
| 6,488,111 | B1 | 12/2002 | McKenna et al. | 6,908,092 B2 | 6/2005 | Kofuji et al. |
| 6,491,122 | B2 | 12/2002 | Leitner et al. | 6,945,832 B2 | 9/2005 | Roycroft |
| 6,498,967 | B1 | 12/2002 | Hopkins et al. | 6,948,581 B2 | 9/2005 | Fecteau et al. |
| 6,499,751 | B1 | 12/2002 | Beleski, Jr. | 6,976,687 B2 | 12/2005 | Beleski, Jr. |
| 6,511,078 | B2 | 1/2003 | Sebe | 7,007,761 B1 | 3/2006 | Johnson, IV |
| 6,523,634 | B1 | 2/2003 | Gagnon et al. | 7,017,685 B2 | 3/2006 | Schoenberg |
| 6,533,309 | B2 | 3/2003 | Lin | 7,029,014 B2 | 4/2006 | Hamm |
| 6,540,243 | B2 | 4/2003 | Takayanagi et al. | 7,055,993 B2 | 6/2006 | Farrow et al. |
| 6,547,027 | B1 | 4/2003 | Kalhok et al. | 7,073,806 B2 | 7/2006 | Bagnoli |
| 6,547,260 | B2 | 4/2003 | Laurent et al. | 7,090,234 B2 | 8/2006 | Takayanagi et al. |
| 6,550,797 | B2 | 4/2003 | Wagner | D528,475 S | 9/2006 | Strilchuk et al. |
| 6,554,302 | B1 | 4/2003 | Liu | 7,100,727 B2 | 9/2006 | Patin et al. |
| 6,556,907 | B1 | 4/2003 | Sakai | 7,131,650 B2 | 11/2006 | Melcher |
| D474,431 | S | 5/2003 | Hyndman et al. | 7,143,853 B1 | 12/2006 | Mercier et al. |
| 6,572,130 | B2 | 6/2003 | Greene, Jr. et al. | 7,343,997 B1 | 3/2008 | Matthies |
| 6,575,260 | B2 | 6/2003 | Bourget | 7,416,046 B2 | 8/2008 | Aube et al. |
| 6,588,785 | B2 | 7/2003 | Monary | 2003/0102176 A1 | 6/2003 | Bautista |
| 6,595,531 | B2 | 7/2003 | de Oliveira | 2003/0174493 A1 | 9/2003 | Kinouchi |
| 6,601,862 | B2 | 8/2003 | Kettler | 2003/0188906 A1 | 10/2003 | Bank |
| 6,607,201 | B2 | 8/2003 | Marshburn | 2004/0035623 A1 | 2/2004 | Fecteau et al. |
| D479,160 | S | 9/2003 | Hyndman et al. | 2004/0035624 A1 | 2/2004 | Fecteau et al. |
| 6,612,389 | B1 | 9/2003 | Bell | 2004/0035625 A1 | 2/2004 | Talbot et al. |
| 6,622,806 | B1 | 9/2003 | Matsuura | 2004/0036250 A1 | 2/2004 | Kofuji |
| 6,626,260 | B2 | 9/2003 | Gagnon et al. | 2004/0072479 A1 | 4/2004 | Roycroft |
| 6,655,705 | B2 | 12/2003 | Turgeon | 2004/0094350 A1 | 5/2004 | Bogatay et al. |
| 6,659,488 | B1 | 12/2003 | Beresnitzky et al. | 2004/0100059 A1 | 5/2004 | Van Den Brink et al. |
| D485,514 | S | 1/2004 | Berg | 2004/0129473 A1 | 7/2004 | Talbot et al. |
| D485,788 | S | 1/2004 | Guay et al. | 2004/0140644 A1 | 7/2004 | Kofuji et al. |
| 6,672,602 | B2 | 1/2004 | Way, II et al. | 2004/0173981 A1 | 9/2004 | Patin et al. |
| 6,676,146 | B2 | 1/2004 | Boyd | 2004/0227318 A1 | 11/2004 | Beleski, Jr. |
| 6,688,620 | B2 | 2/2004 | Serra et al. | 2004/0227321 A1 | 11/2004 | Kuroki et al. |
| 6,705,674 | B1 | 3/2004 | McMahan et al. | 2005/0012291 A1 | 1/2005 | Bagnoli |
| 6,708,579 | B2 | 3/2004 | Punko | 2005/0039967 A1 | 2/2005 | Aube et al. |
| 6,719,319 | B2 | 4/2004 | Liao | 2005/0072613 A1 | 4/2005 | Maltais et al. |
| 6,732,830 | B2 | 5/2004 | Gagnon et al. | 2005/0099818 A1 | 5/2005 | Gropp et al. |
| 6,734,645 | B2 | 5/2004 | Auerbach | 2005/0109552 A1 | 5/2005 | Nakabayashi et al. |
| 6,739,616 | B2 | 5/2004 | Lin | 2005/0205320 A1 | 9/2005 | Girouard et al. |
| 6,742,797 | B2 | 6/2004 | Lopez | 2005/0205321 A1 | 9/2005 | Girouard et al. |
| 6,761,241 | B2 | 7/2004 | Kohda | 2005/0205322 A1 | 9/2005 | Girouard et al. |
| 6,763,905 | B2 | 7/2004 | Cocco et al. | 2005/0217909 A1 | 10/2005 | Guay et al. |
| 6,764,099 | B2 | 7/2004 | Akiyama et al. | 2005/0236791 A1 | 10/2005 | Carr |
| 6,766,876 | B2 | 7/2004 | Ozeki et al. | 2005/0236803 A1 | 10/2005 | Summers et al. |
| 6,783,158 | B2 | 8/2004 | Nakagawa et al. | 2005/0279244 A1 | 12/2005 | Bose |
| 6,793,033 | B2 | 9/2004 | Yamazaki et al. | 2006/0054370 A1 | 3/2006 | Sugioka et al. |
| 6,805,362 | B1 | 10/2004 | Melcher | 2006/0065463 A1 | 3/2006 | Handa et al. |
| 6,817,617 | B2 | 11/2004 | Hayashi | 2006/0065464 A1 | 3/2006 | Kofuji |
| 6,827,358 | B2 | 12/2004 | Beleski, Jr. | 2006/0086555 A1 | 4/2006 | Dower |
| 6,851,691 | B2 | 2/2005 | Rasidescu et al. | 2006/0097471 A1 | 5/2006 | Van Den Brink et al. |
| D502,431 | S | 3/2005 | Matthies | 2006/0151232 A1 | 7/2006 | Marcacci |
| D502,893 | S | 3/2005 | Matthies | 2006/0180372 A1 | 8/2006 | Mercier et al. |
| D502,894 | S | 3/2005 | Matthies | 2006/0249921 A1 | 11/2006 | Patin et al. |
| D502,895 | S | 3/2005 | Matthies | 2006/0254842 A1 | 11/2006 | Dagenais et al. |
| 6,863,288 | B2 | 3/2005 | Van Den Brink et al. | 2006/0255550 A1 | 11/2006 | Pfeil et al. |
| 6,866,110 | B2 | 3/2005 | Mallette et al. | 2007/0176384 A1 * | 8/2007 | Brudeli ............... 280/124.103 |
| 6,871,718 | B2 | 3/2005 | McGuire | | | |

* cited by examiner ion No. 60/722,114 filed on Sep. 30, 2005, the entire
LEANING SUSPENSION MECHANICS

RELATED APPLICATIONS

Priority is hereby claimed to U.S. Provisional Patent Application No. 60/722,114 filed on Sep. 30, 2005, the entire contents of which are incorporated herein by reference.

BACKGROUND

The present invention relates to vehicles with leaning suspension systems. In particular, the present invention relates to three-wheeled vehicles with leaning suspension systems.

SUMMARY

The present invention relates to a suspension system for a three-wheeled vehicle. The suspension system permits the vehicle to lean while cornering, much like a motorcycle. This is accomplished via hydraulic actuators that force the bike into a leaning position while turning, and back to an upright position while tracking a straight line. A transverse beam is coupled to the hydraulic actuators and to spring dampers to allow the suspension to operate independently, even while the vehicle is cornering.

In one embodiment of the invention, a vehicle includes a frame, left and right wheels, and a leaning suspension system. The frame defines a longitudinal vehicle axis. The left wheel is disposed on the left side of the vehicle axis, and the right wheel is disposed on the right side of the vehicle axis. The leaning suspension system includes a transverse beam, left and right damping members, left and right control arms, and at least one lean actuator. The transverse beam is coupled to the frame and pivotable about the vehicle axis. The left damping member is pivotally coupled to a left side of the transverse beam, and the right damping member is pivotally coupled to a right side of the transverse beam. The left control arm has a first end pivotally coupled to the left wheel and an opposite end coupled to the frame, and the right control arm has a first end pivotally coupled to the right wheel and an opposite end coupled to the frame. The lean actuator is pivotally connected between the frame and the transverse beam. The lean actuator is configured to extend and retract to tilt the left and right wheels and to lean the vehicle while cornering.

In another embodiment of the invention, a vehicle includes a frame, left and right wheels, and a leaning suspension system. The frame defines a longitudinal vehicle axis. The left wheel is disposed on the left side of the vehicle axis, and the right wheel is disposed on the right side of the vehicle axis. The leaning suspension system includes a transverse beam, left and right control arms, and at least one lean actuator. The transverse beam is coupled to the frame and is pivotable about the vehicle axis. The left control arm has an end pivotally coupled to the left wheel and an opposite end coupled to the frame. The right control arm has an end pivotally coupled to the right wheel and an opposite end coupled to the frame. The opposite ends of the right and left upper control arms are forked. At least a portion of the transverse beam is disposed between the forked ends of the right and left control arms. The lean actuator is pivotally connected between the frame and the transverse beam, and is configured to extend and retract to tilt the left and right wheels and to lean the vehicle while cornering.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out In various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
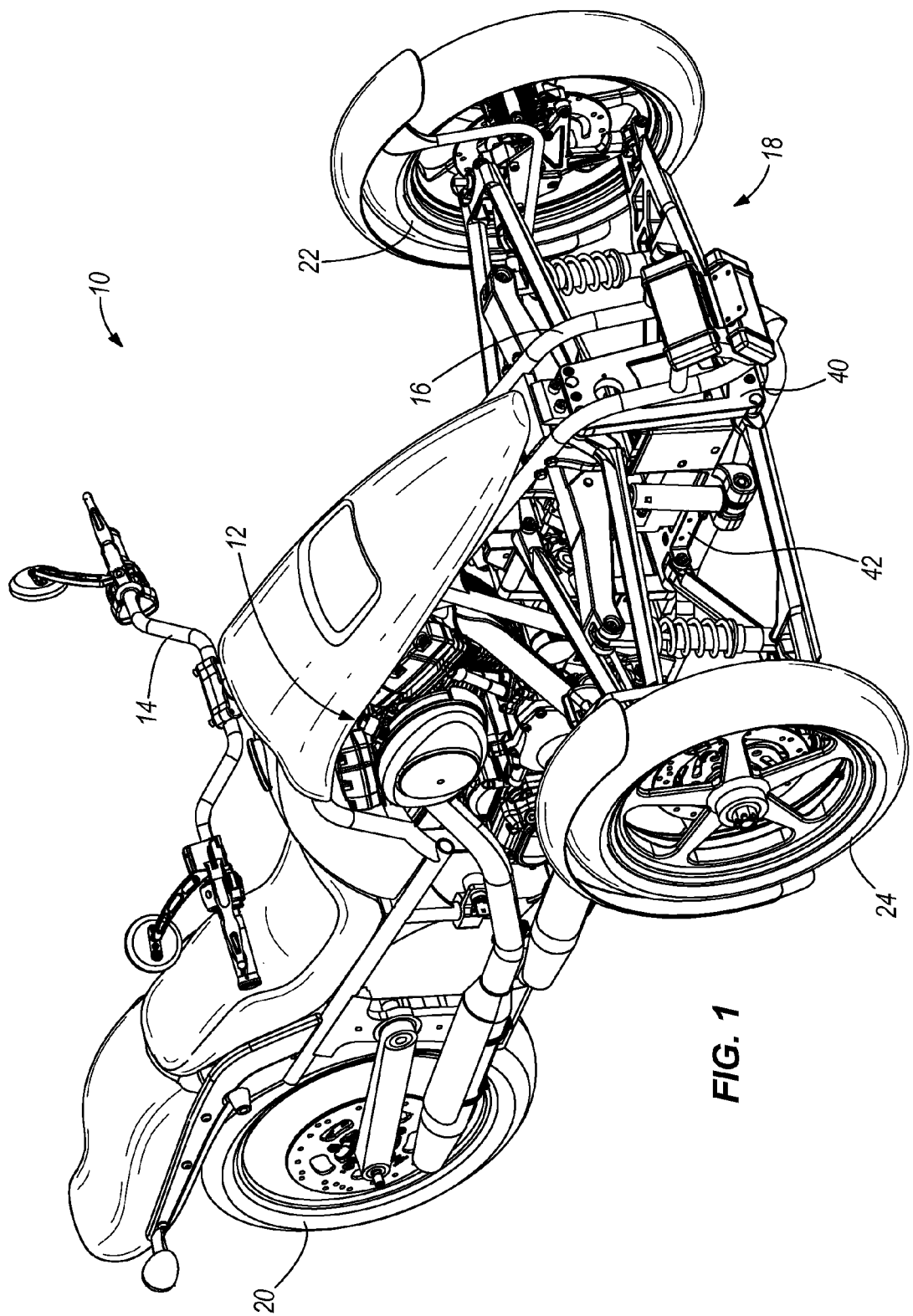
FIG. 1 is a perspective view of a three-wheeled motorcycle including a leaning front suspension embodying the present invention.
Figure 2:
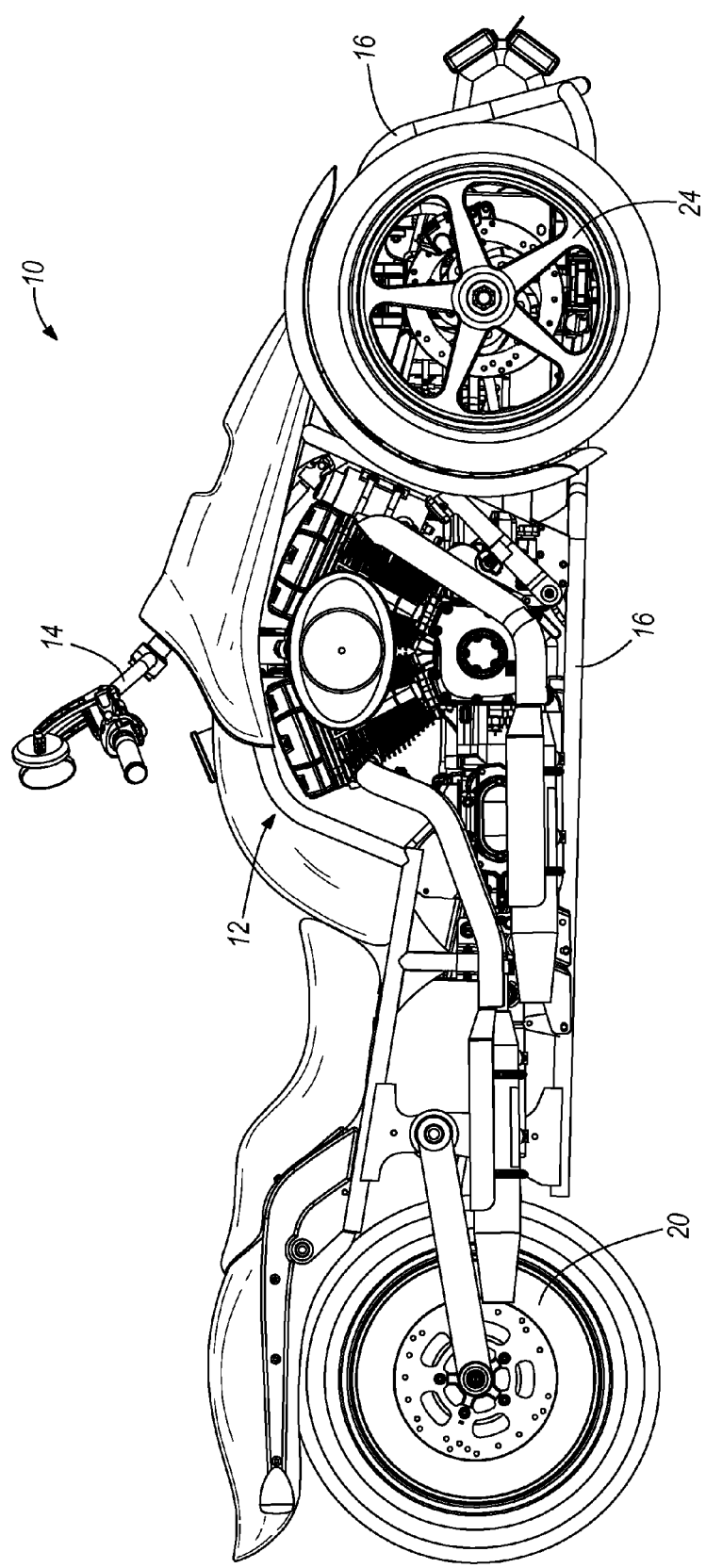
FIG. 2 is a side view of the three-wheeled motorcycle of FIG. 1.

FIGS. 1 and 2 illustrate a three-wheeled motorcycle or trike 10 having an engine 12, handlebars 14, a frame 16, a single rear wheel 20, and first and second front wheels 22, 24. The rear wheel 20 is mounted to a rear portion of the frame 16, and the front wheels 22, 24 are coupled to the frame 16 via a leaning suspension system 18. The frame 16 includes a front bulkhead 40 and a main bulkhead 42 defining the front portion of the frame 16. The front bulkhead 40 is connected to the main bulkhead 42 to stiffen and strengthen the entire suspension system 18 The engine 12 is coupled to the rear wheel 20 through a drive assembly (not shown) to propel the trike 10. The handlebars 14 are pivotally coupled to the front portion of the frame 16 and coupled to the front wheels 22, 24 through a steering system to turn the front wheels 22, 24.

The illustrated embodiment is for a trike 10 having two steerable front wheels 22, 24 and a single, driven rear wheel 20. It should be noted that it is within the scope of the invention to employ the suspension of the present invention in a vehicle having two rear wheels and a single front wheel. Also, in other embodiments, the suspension can be used for both the front and rear wheels in a vehicle having four wheels, such as an ATV.

Figure 3:
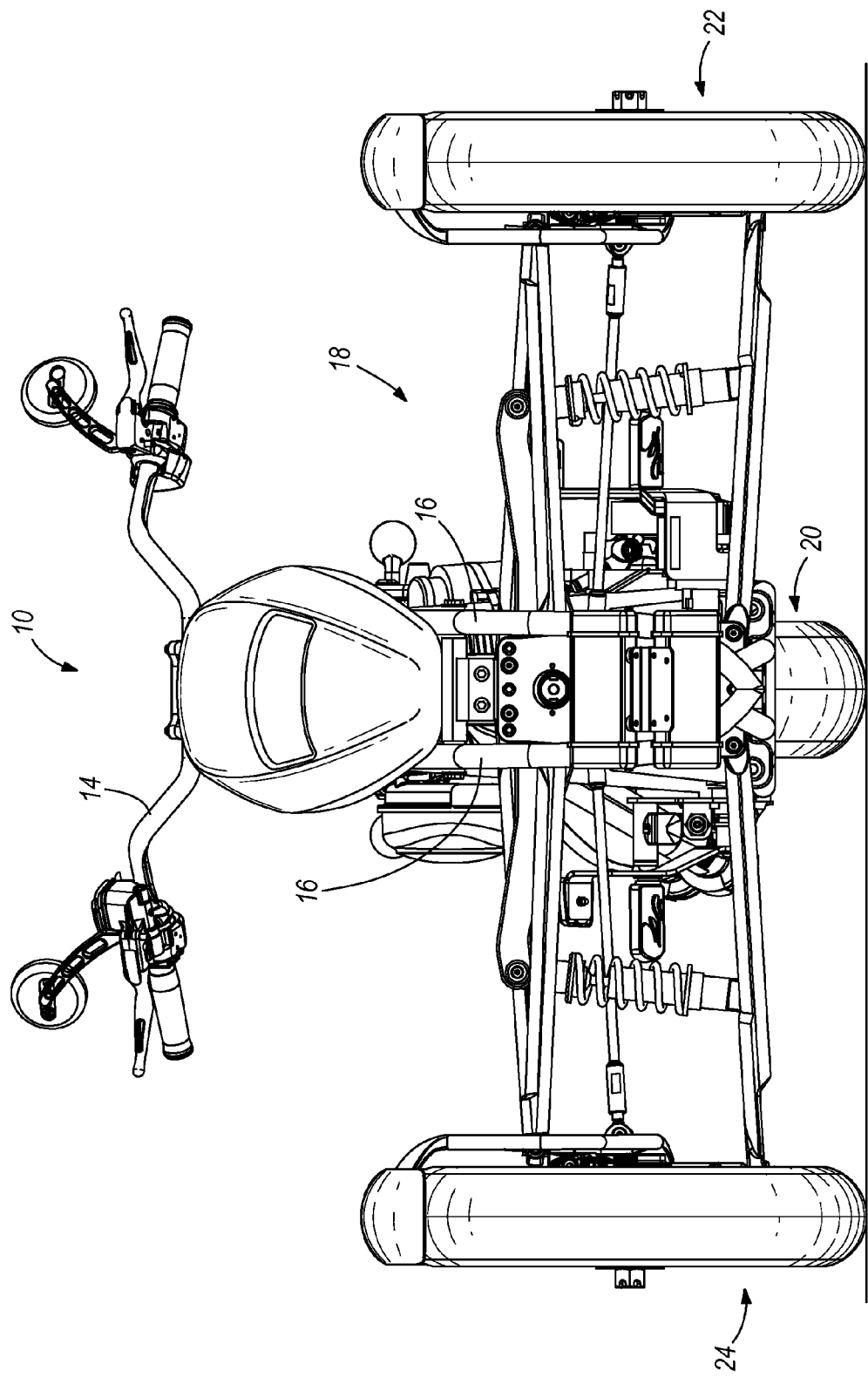
FIG. 3 is a front view of the three-wheeled motorcycle of FIG. 1, illustrating the three-wheeled motorcycle in an upright position.
Figure 4:
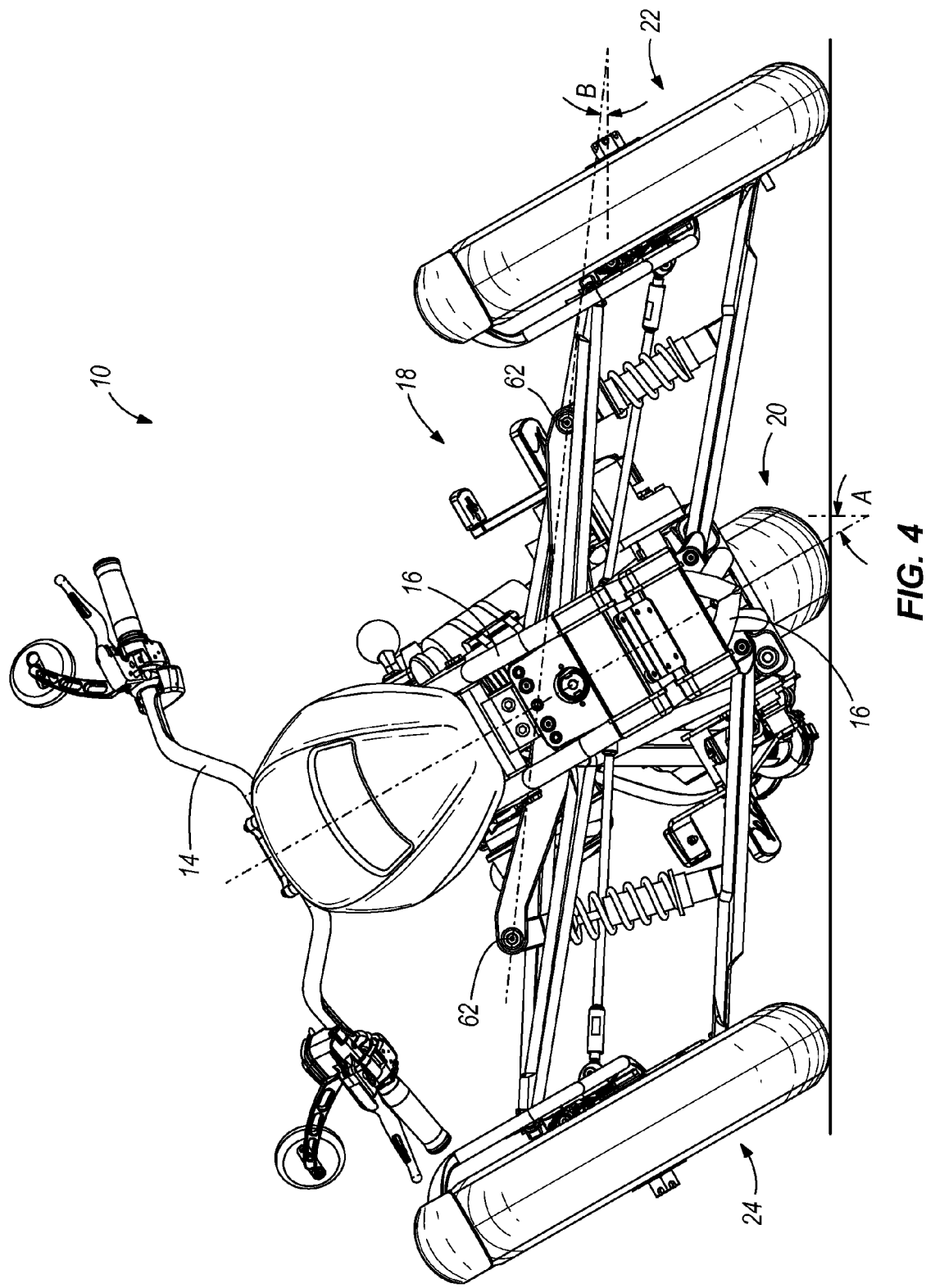
FIG. 4 is a front view of the three-wheeled motorcycle of FIG. 1, illustrating the three-wheeled motorcycle in a leaning position.

FIG. 3 illustrates the orientation of the suspension system 18 while the trike 10 tracks a straight line on a flat surface. FIG. 4 illustrates the same front view of the trike 10 as FIG. 3, but in a leaning configuration. This view shows how the suspension system 18 is oriented when the trike 10 is turning, or tracking an arcuate path. It should be noted that in order to highlight the different positions of the suspension system 18 between FIGS. 3 and 4, the handlebar 14 and wheel 22, 24 positions are illustrated in the same, center, straight-forward position for both FIGS. 3 and 4. Although this position is correctly illustrated in FIG. 3, the handlebar 14 position and the wheel 22, 24 positions in FIG. 4 normally would be pivoted and turned, respectively, toward or into the direction of the turn.

Figure 5:
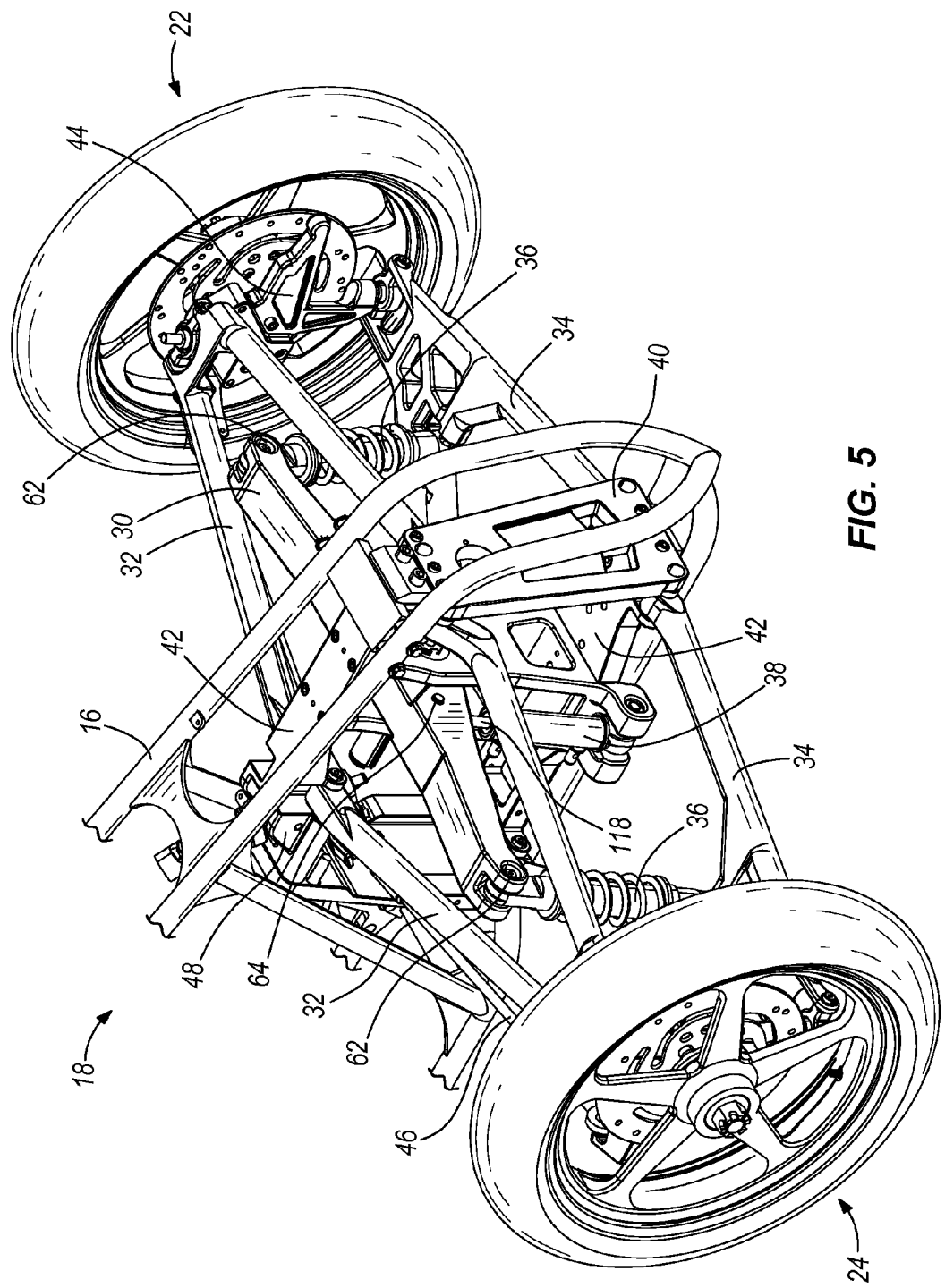
FIG. 5 is an enlarged perspective view of the front suspension of the three-wheeled motorcycle of FIG. 1.
Figure 6:
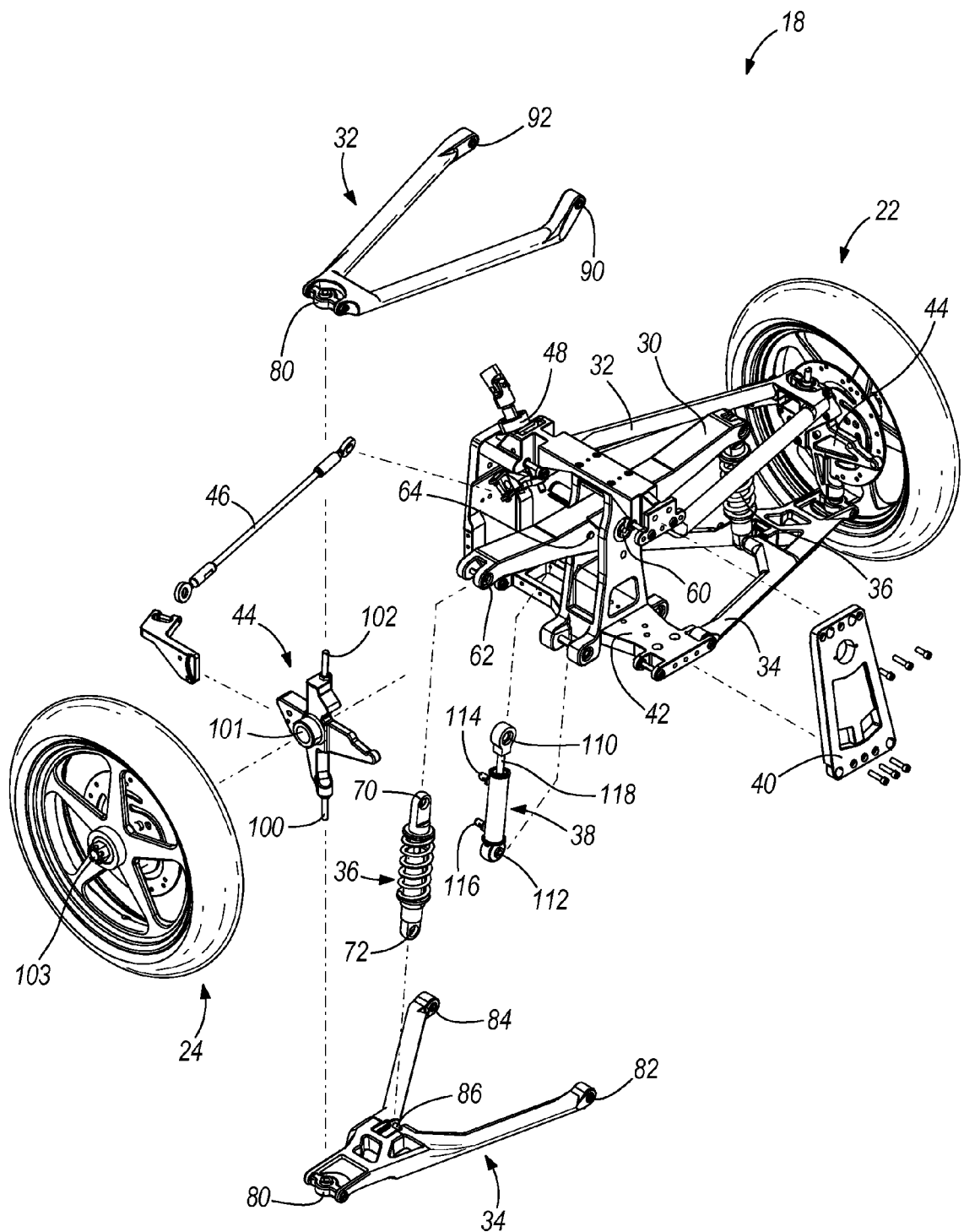
FIG. 6 is an exploded perspective view of the front suspension of the three-wheeled motorcycle of FIG. 1.

Referring to FIGS. 5 and 6, the leaning suspension system 18 includes a transverse beam 30, upper control arms 32, lower control arms 34, spring dampers 36, hydraulic actuators 38, and spindles 44. The spindles 44 each include upper and lower pins 102, 100, as well as means for coupling to one of the front wheels 22, 24, such as a hole 101 for receiving a wheel axle 103. The structure of the spindle 44 is well known to those skilled in the art.

The transverse beam 30 is rigid and remains substantially horizontal during operation of the trike 10. The transverse beam 30 has a center pivot point 60, end pivot points 62, and intermediate pivot points 64. The transverse beam 30 is pivotally coupled to the main bulkhead 42 at the center pivot 60. The center pivot 60 is positioned to coincide with the longitudinal centerline of the trike 10 and defines a pivot axis that is parallel to the vehicle centerline. The end pivot points 62 are pivotally coupled to upper pivots 70 on the spring dampers 36.

With reference to FIGS. 3 and 4, the vehicle lean angle A and the pivot angle B of the substantially horizontal transverse beam 30 are illustrated. As shown in FIG. 4, the transverse beam 30 defines a line between its pivot points 62, and this line defines the pivot angle B relative to the horizontal riding surface. In FIG. 3, the vehicle is upright (i.e., a lean angle A of 0 degrees) and the transverse beam 30 is horizontal (i.e., parallel to the horizontal riding surface with a pivot angle B of 0 degrees). In FIG. 4, the vehicle is leaning approximately 30 degrees with respect to vertical (i.e, a lean angle A of 30 degrees), and the transverse beam 30 remains substantially horizontal while pivoting only approximately 5 degrees in the opposite direction relative to horizontal (i.e., pivot angle B of 5 degrees). As used herein, the transverse beam 30 is said to be substantially horizontal when the pivot angle B is less than 10 degrees relative to horizontal, more specifically less than 5 degrees relative to horizontal, and even more specifically less than 3 degrees relative to horizontal.

The lower control arms 34 have trunnions 80 coupled to one end and adapted to receive the lower pin 100 on the spindles 44. These trunnions 80 allow the suspension to operate independent of wheel steering by permitting the spindles 44 to pivot and turn regardless of the position of the lower control arms 34. The two remaining ends of the lower control arms 34 include front and rear pivot points 82, 84 that are pivotally connected to the main bulkhead 42. A central pivot 86 is located centrally on the lower control arms 34 and is adapted to pivotally couple to lower pivot points 72 on the spring dampers 36.

The upper control arms 32 also have trunnions 80 rotatably coupled to one end and adapted to rotatably receive the upper pin 102 on the spindles 44. These trunnions 80 allow the suspension to operate independent of wheel steering. The two remaining ends of the upper control arms 32 include front and rear pivot points 90, 92 that are pivotally connected to the main bulkhead 42.

In the illustrated embodiment, the transverse beam 30 is positioned between the front and rear pivots 90, 92 on the upper control arms 32. At least a portion of the transverse beam 30 is disposed and substantially centered between the forked ends of the control arms 32. The control arms 32 define a substantially horizontal plane that intersects at least a portion of the transverse beam 30. In other embodiments, the transverse beam 30 could be positioned in front of the front pivots 90, behind the rear pivots 92, or coupled to a different location than the upper control arms 32 (i.e. coupled to a different bulkhead).

As mentioned above, the spring dampers 36 include upper and lower pivot points 70, 72 connecting the transverse beam 30 to the lower control arms 34. The spring dampers 36 include a shock absorbing member surrounded by a biasing member. This style of spring damper 36 is well known to those skilled in the art, and will not be discussed in further detail. Alterative embodiments may utilize a different method of biasing and shock absorbing, such as leaf springs, coil springs, or air springs.

The hydraulic actuators 38 include upper and lower pivot points 110, 112. The illustrated embodiment shows the upper pivot points 110 of the hydraulic actuators 38 are pivotally coupled to the intermediate pivot points 64 on the transverse beam 30 at a location between the center pivot point 60 and one of the end pivot points 62. Other embodiments could include the hydraulic actuators 38 pivotally coupled to the end pivot points 62 and the spring dampers 36 pivotally coupled to the transverse beam 30 at a location between the center pivot point 60 and one of the end pivot points 62. The hydraulic actuators 38 and spring dampers can also be pivotally coupled to other points along the transverse beam 30.

The hydraulic actuators 38 in the illustrated embodiment include a cylinder having top and bottom fluid ports 114, 116. A piston (not shown) exists at the end of a shaft 118 within each cylinder. When hydraulic fluid is forced into the top fluid port 114 by a hydraulic pump (not shown), the internal piston is forced down, and the shaft 118 retracts. While this is happening, hydraulic fluid is being forced out of the bottom fluid port 116 and into a reservoir (not shown). When hydraulic fluid is forced into the bottom fluid port 116, the internal piston is forced up, and the shaft 118 extends. While this is happening, hydraulic fluid is being forced out of the top fluid port 114 and into the reservoir.

The hydraulic actuators 38 act to control the orientation of the trike 10. When entering a turn, one of the hydraulic actuators 38 extends in length while the other retracts, moving the trike 10 into a leaning position as illustrated in FIG. 4. When the trike 10 is leaving the turn, the hydraulic actuators 38 act to bring the trike 10 back to a vertical orientation as illustrated in FIG. 3. The hydraulic actuators are controlled by a leaning suspension control system that monitors at least one characteristic of the trike such as handlebar position (i.e., steering angle), speed, acceleration, etc. Safety features can be present to ensure the trike 10 is returned to the vertical orientation when the engine 12 is turned off, or if there is a malfunction in the control of the hydraulic system.

The substantially horizontal orientation of the transverse beam 30 is maintained by the Influence of the spring dampers 36. The lower control arms 34 are connected to the front wheels 22, 24 through the spindles 44 and to the transverse beam 30 by the spring dampers 36. The front wheels 22, 24, and thus the lower control arms 34, remain substantially parallel to the road during normal operation. The road is generally substantially planar for the width of the trike 10 meaning that as long as both front wheels 22, 24 are in contact with the road, whether cornering or tracking a straight line, the spring dampers 36 will bias the transverse beam 30 to a position that is substantially parallel to the road. The hydraulic actuators 38 connect the frame 16 to the transverse beam 30, and control the lean of the trike 10. As a hydraulic actuator 38 extends. it pushes the frame 16 away from the transverse beam 30, initiating lean. The biasing force from the spring dampers 36 acting on the transverse beam creates a larger moment about the central pivot 86 than the hydraulic actuators 38, so extension of the hydraulic actuators 38 moves the frame 16 with respect to the beam 30.

The steering system includes spindles 44, tie rods 46, and the steering box 48. The handlebars 14 are coupled to the steering box 48 such that when an operator turns the handlebars 14, an output shaft (not shown) on the steering box 48 rotates. The output shaft is pivotally coupled to a first end of each tie rod 46. The second end of each tie rod 46 is pivotally coupled to a bracket secured to one of the spindles 44. As the output shaft on the steering box 48 rotates, the tie rods 46 follow, pulling one spindle 44 and pushing the other. The spindles 44 are rotatably coupled to the upper and lower control arms 32, 34 by upper and lower pins 102, 100. Thus the pushing or pulling action initiated by the tie rods 46 causes the spindles 44, and thus the front wheels 22, 24, to rotate about the upper and lower pins 102, 100.

Using hydraulic actuators 38 as discussed affords some major advantages to trikes. First, since the lean of the trike 10 is controlled by the hydraulic actuators 38, the upper and lower control arms 32, 34, spring dampers 36, and steering components are free to act normally, regardless of the trike's 10 lean. This allows the trike 10 to absorb bumps while tracking an arcuate path in the same manner it would if it were tracking a straight line, making for a consistent suspension action, even while turning.

What is claimed is:

1. A vehicle comprising:
   a frame defining a longitudinal vehicle axis;
   a left wheel disposed on the left side of the vehicle axis;
   a right wheel disposed on the right side of the vehicle axis;
   a leaning suspension system including
      a transverse beam coupled to the frame and pivotable about the vehicle axis,
      a left damping member pivotally coupled to a left side of the transverse beam,
      a right damping member pivotally coupled to a right side of the transverse beam,
      a left upper control arm having a first end pivotally coupled to the left wheel and an opposite end coupled to the frame,
      a right upper control arm having a first end pivotally coupled to the right wheel and an opposite end coupled to the frame,
      a left lower control arm having a first end pivotally coupled to the left wheel and an opposite end pivotally coupled to the frame,
      a right lower control arm having a first end pivotally coupled to the right wheel and an opposite end pivotally coupled to the frame, and
      at least one lean actuator pivotally connected between the frame and the transverse beam, the lean actuator configured to extend and retract to tilt the left and right wheels and to lean the vehicle while cornering, such that the left and right wheels tilt substantially the same amount as a lean angle of the vehicle.

2. The vehicle of claim 1, wherein ends of the right and left upper control arms are forked, and wherein at least a portion of the transverse beam is disposed between the forked ends of the right and left upper control arms.

3. The vehicle of claim 2, wherein at least a portion of the transverse beam is located within a substantially horizontal plane defined by one of the left upper control arm and the right upper control arm.

4. The vehicle of claim 3, wherein the transverse beam is substantially centered between the forked ends of the right and left upper control arms.

5. The vehicle of claim 1, wherein the left damping member is pivotally coupled between the left lower control arm and the left side of the transverse beam, and the right damping member pivotally coupled between the right lower control arm and the right side of the transverse beam.

6. The vehicle of claim 5, wherein the left damping member is pivotally coupled to a left end of the transverse beam at a left pivot point, and the right damping member is pivotally coupled to a right end of the transverse beam at a right pivot point.

7. The vehicle of claim 6, wherein the at least one lean actuator includes one end pivotally coupled to the frame and an opposite end pivotally coupled to the transverse beam between the vehicle axis and one of the right or left pivot points.

8. The vehicle of claim 1, wherein the at least one lean actuator includes a left lean actuator pivotally coupled between the frame and a left side of the transverse beam and a right lean actuator pivotally coupled between the frame and a right side of the transverse beam.

9. The vehicle of claim 1, further comprising handlebars pivotally coupled to the frame, a left tie rod coupled between the handlebars and the left wheel, and a right tie rod coupled between the handlebars and the right wheel.

10. The vehicle of claim 1, wherein the transverse beam remains substantially horizontal when the wheels tilt and the vehicle leans.

11. The vehicle of claim 1, further comprising a left spindle coupled between the left upper control arm and the left wheel, and a right spindle coupled between the right upper control arm and the right wheel.

12. A vehicle comprising:
    a frame defining a longitudinal vehicle axis;
    a left wheel disposed on the left side of the vehicle axis;
    a right wheel disposed on the right side of the vehicle axis;
    a leaning suspension system including
       a transverse beam coupled to the frame and pivotable about the vehicle axis,
       a left upper control arm having an end pivotally coupled to the left wheel and an opposite end coupled to the frame,
       a right upper control arm having an end pivotally coupled to the right wheel and an opposite end coupled to the frame, wherein the opposite ends of the right and left upper control arms are forked, and wherein at least a portion of the transverse beam is disposed between the forked ends of the right and left upper control arms,
       a left lower control arm having an end pivotally coupled to the left wheel and an opposite end coupled to the frame,
       a right lower control arm having an end pivotally coupled to the right wheel and an opposite end coupled to the frame, and
       at least one lean actuator pivotally connected between the frame and the transverse beam, the lean actuator configured to extend and retract to tilt the left and right wheels and to lean the vehicle while cornering, such that the left and right wheels tilt substantially the same amount as a lean angle of the vehicle.

13. The vehicle of claim 12, wherein at least a portion of the transverse beam is located within a substantially horizontal plane defined by one of the left upper control arm and the right upper control arm.

14. The vehicle of claim 13, wherein the transverse beam is substantially centered between the forked ends of the right and left upper control arms.

15. The vehicle of claim 14, further comprising a left damping member pivotally coupled between the left lower control arm and the left side of the transverse beam, and a right damping member pivotally coupled between the right lower control arm and the right side of the transverse beam.

16. The vehicle of claim 15, wherein the left damping member is pivotally coupled to a left end of the transverse beam at a left pivot point, and the right damping member is pivotally coupled to a right end of the transverse beam at a right pivot point.

17. The vehicle of claim 16, wherein the at least one lean actuator includes one end pivotally coupled to the frame and an opposite end pivotally coupled to the transverse beam between the vehicle axis and one of the right or left pivot points.

18. The vehicle of claim 12, wherein the at least one lean actuator includes a left lean actuator pivotally coupled between the frame and a left side of the transverse beam and a right lean actuator pivotally coupled between the frame and a right side of the transverse beam.

19. The vehicle of claim 12, further comprising handlebars pivotally coupled to the frame, a left tie rod coupled between the handlebars and the left wheel, and a right tie rod coupled between the handlebars and the right wheel.

20. The vehicle of claim 12, wherein the transverse beam remains substantially horizontal when the wheels tilt and the vehicle leans.

21. The vehicle of claim 12, further comprising a left spindle coupled between the left upper control arm and the left wheel, and a right spindle coupled between the right upper control arm and the right wheel.

* * * * *